United States Patent Office 3,282,835
Patented Nov. 1, 1966

3,282,835
CARBONATED BRIGHT STOCK SULFONATES AND LUBRICANTS CONTAINING THEM
Peter A. Asseff, Cleveland, Ohio, assignor to The Lubrizol Corporation, Wickliffe, Ohio, a corporation of Ohio
No Drawing. Filed Feb. 12, 1963, Ser. No. 257,862
12 Claims. (Cl. 252—33.2)

This invention relates to the lubrication of internal combustion engines. In a more particular sense, it relates to the lubrication of gasoline and diesel engines, especially engines intended for heavy duty service.

Internal combustion engines for heavy duty service such as is characteristic of locomotives and sea-going vessels usually operate on diesel fuels. For reasons of economy such fuels are not rigorously refined and often contain a relatively large amount of sulfur. Upon combustion of such fuels a significant quantity of sulfur oxides and other precursors of corrosive sulfur acids are formed. These products invariably come into contact with the lubricant which is provided for the lubrication of the pistons and cylinder walls of the combustion chamber. In most instances they also escape into the crankcase where they are mixed with the crankcase lubricant and circulated therewith throughout the engine.

The problems created by the contamination of the lubricant with the combustion products are manyfold. For instance, the combustion products are corrosive to the metal parts with which they come into contact. They also promote deterioration of the lubricant and cause the formation of harmful decomposition products which form deposits in the engine. An especially serious problem is associated with the presence in the lubricant of both the combustion products and a small amount of water, the latter being a common contaminant resulting from the decomposition of the lubricating oil. Water converts some of the combustion products to acids such as sulfuric and sulfurous acids. Because of the relatively small amount of water in proportion to the amount of acid precursors present in the lubricant, the acids formed thereby will be highly concentrated. Thus, unlike the minor problems posed by the formation of relatively dilute acids in a lubricant of the emulsion type which contains a large amount, e.g., 40% or more, of water, the highly concentrated acids are considerably more corrosive to metal parts and more effective to cause deterioration of the lubricating oil than are the combustion products themselves. Water also causes rusting of the metal parts. It will be readily appreciated that the presence of a small amount of water in the lubricant is objectionable. However, if the water can be eliminated from the lubricant about as fast as it accumulates, its harmful action can be minimized.

The problem of deposits in the engine has been approached by the incorporation in the lubricant of a detergent additive such as a metal salt of an oil-soluble organic acid. The additive functions to disperse the oil degradation products in the lubricant and thus prevents the agglomeration of such products to form insoluble substances. A disadvantage, however, is the tendency of the detergent to emulsify water in the lubricant. Emulsification helps to retain the water in the lubricant and increases the opportunity of forming concentrated corrosive acids from water and the acid precursors present as contaminants in the lubricant. A great deal of effort has been devoted to the development of lubricants which are not only capable of reducing engine deposits but also resistant to emulsification with water.

The emulsion resistance of the lubricants is also important from another standpoint. In the storage and transportation of lubricants for engines of sea-going vessels, it is a common occurrence that the lubricant comes into intimate contact with water. For instance, the lubricant often is stored in tanks which also contain water to make up for the proper ballast. Another example is the frequent practice of metering the lubricant from a storage tank to the engine to be lubricated by allowing it to pass through a column of water at a controlled rate. In these circumstances, unless the lubricant is resistant to emulsion it will be contaminated with water as it is circulated throughout the engine and cause considerable rusting and corrosion of the engine parts.

It is, accordingly, a principal object of this invention to provide lubricating compositions.

It is also an object of this invention to provide lubricant additives and methods of preparing lubricant additives.

It is also an object of this invention to provide lubricating compositions for use in internal combustion engines, especially diesel engines.

It is also an object of this invention to provide a method of lubricating internal combustion engines.

It is also an object of this invention to provide a method of preparing lubricating compositions.

These and other objects are attained in accordance with this invention by providing an oil-soluble composition suitable for use as a detergent having a reduced tendency to emulsify water comprising a carbonated, basic alkaline earth metal salt of an acidic substance selected from the class consisting of bright stock sulfonic acids and mixtures of at least about 50% of a bright stock sulfonic acid and less than about 50% of a carboxylic acid having at least about 12 aliphatic carbon atoms, said metal salt being characterized by a metal ratio of at least about 3.

The term "metal ratio" is used herein to designate the ratio of the total chemical equivalents of the metal in the metal salt to the chemical equivalents of the metal which is in the form of a normal salt, i.e., a neutral salt of the acid. To illustrate, a metal salt having 5 equivalents of metal per equivalent of the organic acid radical has a metal ratio of 5.

A critical element of this invention is the derivation of the carbonated, basic alkaline earth metal salt from bright stock sulfonic acids. Bright stock is the relatively viscous, petroleum fraction obtained by dewaxing and treatment with, e.g., fuller's earth of the distillation residue after the volatile petroleum fractions have been separated. It usually has a viscosity value of at least about 80 SUS (Saybolt Universal seconds) at 210° F., more often from about 85 SUS to about 250 SUS at 210° F. Its molecular weight may range from about 500 to 2000 or even greater. Sulfonic acids can be obtained from bright stock by any of the known methods such as treating the bright stock with sulfuric acid, sulfur trioxide, oleum, chlorosulfonic acid, or any other sulfonating reagent. Sulfonic acids can also be obtained by irradiating a mixture of bright stock and sulfur dioxide and chlorine. These methods are known in the art and need not be further illustrated here. Bright stock sulfonic acids having molecular weights from about 500 to about 2000 are especially desirable for preparing the carbonated, basic alkaline earth metal salt useful in the lubricating compositions of this invention.

The carboxylic acids which may be used together with the bright stock sulfonic acids to prepare the metal salts of this invention may be aliphatic or aliphatically-substituted aromatic acids having at least about 12 aliphatic carbon atoms within their molecular structure. They are exemplified by palmitic acid, stearic acid, myristic acid, oleic acid, linoleic acid, behenic acid, hexatriacontanoic acid, 9-methylstearic acid, 9,10-dichlorostearic acid, naphthenic acid, stearylbenzoic acid, wax(eicosane)-substituted naphthoic acid, dilauryl-decahydronaphthalene carboxylic acid, didodecyl-tetralin carboxylic acid, dioctyl, cyclohexane carboxylic acid. Commercial fatty acids are especially useful. They include, for example, the acids obtained by the hydroylsis of sperm oil, tall oil, or other fatty esters. Still other carboxylic acids include alkenyl succinic acids or anhydrides in which the alkenyl group contains at least about 12 carbon atoms. Such acids or anhydrides are illustrated by those obtained by the reaction of maleic acid or anhydride with a polyisobutene having a molecular weight of about 700–1000.

It will be noted, however, that where a mixture of acids is used to prepare the metal salts, the mixture should contain at least about 50% by weight of the bright stock sulfonic acid. The minimum amount of the bright stock sulfonic acid is based upon the discovery that the metal salts obtained from an acid mixture containing a lesser amount of this acid are not effective for the purposes of this invention. In many instances, it is preferred that the acid mixture contains at least about 70% of the bright stock sulfonic acid.

The carbonated, basic alkaline earth metal salts may be the salts of magnesium, calcium, strontium, or barium. The calcium salts are preferred because of their particular effectiveness in the lubricating compositions of this invention.

A convenient method for preparing the metal salts comprises carbonating a substantially anhydrous mixture of the acid reactant with at least about three chemical equivalents of an alkaline earth metal base per equivalent of the acid in the presence of a promoting agent. The metal base may be an alkaline earth metal oxide, hydroxide, bicarbonate, sulfide, mercaptide hydride, alcoholate, or phenate. It is preferrably an oxide, alcoholate, or hydroxide of calcium. The carbonation usually is carried out in a fluid solvent which facilitates mixing and temperature control. The solvent may be mineral oil, hexane, naphtha, dodecane, benzene, toluene, xylene, or any other fluid hydrocarbon. It may also be a polar-substituted hydrocarbon such as chlorobenzene, diphenyl oxide, or nitrobenzene.

The promoting agent is, for the most part, a hydroxy compound such as an alcohol or a phenol. It may be, for example, methanol, ethanol, isopropanol, cyclohexanol, dodecanol, behenyl alcohol, ethylene glycol, diethylene glycol, triethylene glycol, monomethylether of ethylene glycol, monobutyl ether of diethylene glycol, hexamethylene glycol, glycerol, pentaerythritol, benzyl alcohol, 2-phenylethyl alcohol, phenol, naphthol, cresol, catechol, p-tert-butylphenol, polyisobutene (molecular weight of 350)-substituted phenol, o,p-didodecylphenol, alpha-hexyl-beta-naphthol, m-cyclohexylphenol, 4,4′methylene bis-phenol, 2,2′-methylene-4,4′-dioctyl bis-phenol, aminoethyl alcohol, o-chlorophenol, m-nitrophenol, o-methoxyphenol, hexatriacontanyl alcohol, or furfuryl alcohol. Alcohols having up to about 12 carbon atoms are especially effective for use as the promoting agent. Phenol and alkylated phenols having one to three alkyl substituents each of which has up to about 50 carbon atoms are also preferred. Mixtures of alcohols, such as mixtures of methanol and n-pentanol; mixtures of methanol, isobutanol, n-pentanol, and cyclohexanol; mixtures of methanol and glycerol, mixtures of methanol and iso-octanol; etc. are particularly useful.

The amount of the promoting agent to be used in the reaction mixture is best defined in terms of its chemical equivalent per equivalent of the bright stock sulfonic acid or the acid mixture present in the mixture. The amount may be as little as 0.1 equivalent or as much as 10 equivalents or even more per equivalent of the acid reactant. The preferred amount is from about 0.25 to 5 equivalents per equivalent of the acid reactant. It will be noted that the equivalent weight of the promoting agent is based upon the number of the alcoholic or phenolic hydroxyl radicals in a molecule. To illustrate, the equivalent weight of a monohydric alcohol is its molecular weight; that of a trihydric alcohol is one-third of its molecular weight; and that of a bis-phenol is one-half of its molecular weight.

The use of a combination of the above-illustrated hydroxy compound and from about 0.1% to 5%, based on the weight of the carbonation mixture, of an inorganic halide is especially desirable. The halide may be ammonium chloride, ammonium bromide, or an alkali metal or alkaline earth metal halide such as sodium chloride, calcium chloride, potassium chloride, sodium bromide, potassium iodide, barium chloride, magnesium chloride, or sodium iodide. The halide facilitates the carbonation and enables the incorporation of an unusually large amount of metal into the carbonated product.

The carbonation temperature depends to a large measure upon the promoting agent used. When a phenol is used as the promoting agent, the temperature usually ranges from about 80° C. to about 300° C., preferably from about 100° C. to 200° C. When an alcohol is used, the temperature usually will not exceed about 100° C. The carbonation temperature may be as low as about 20° C.

After carbonation, the promoting agent, if it is a volatile substance, may be removed from the product by distillation. If the promoting agent is a relatively non-volatile substance it is usually allowed to remain in the product without any adverse effect. Ordinarily, it is convenient to prepare the carbonated, basic metal salt in a mineral oil so that the product is a fluid oil solution or concentrate which readily mixes with additional quantities of mineral oil to prepare the final lubricating composition. If the carbonation is carried out in the presence of a volatile solvent such as xylene or naphtha, the product may be dissolved in a mineral oil and the resulting oil solution heated to distill off the solvent.

It will be noted that upon mixing with the alkaline earth metal base, the bright stock sulfonic acid or the acid mixture forms a metal salt so that the process mixture contains a metal salt of the acid and a large excess of the metal base. Such a mixture is heterogeneous primarily because of the presence of the large excess of the insoluble metal base. As carbonation proceeds, the metal base becomes solubilized in the organic phase and the carbonated product eventually becomes a homogeneous composition containing an unusually large amount of the metal. The mechanism of the formation of the homogeneous product is not fully understood. It is believed however that carbonation converts the excess metal base to a carbonate or bicarbonate which forms with the metal salt of the acid reactant a homogeneous complex. The complex is readily soluble in solvents such as benzene, xylene, naphtha, and mineral oil. It is not necessary for all of the metal base to be so converted by carbonation to produce a soluble homogeneous product. In many instances a homogeneous product is obtained when as little as 75% of the excess metal base is carbonated. For the sake of convenient reference in the specification and the claims of this invention, the term "carbonated, basic alkaline earth metal salt" designates the homogeneous carbonated product without specific reference to the degree of conversion of the excess metal base by carbonation.

The carbonated, basic metal salts disclosed in U.S. Patent Nos. 3,027,325 and 2,865,956 are especially desirable for use in the lubricating compositions of this invention.

The concentration of the carbonated, basic metal salts in the lubricating compositions of this invention may range from about 0.1% to about 30% by weight. For most applications the preferred concentration is usually from about 0.5% to about 25%. The mineral oils useful as the lubricating oil base are preferably the refined oils having viscosity values ranging from about 50 SUS at 100° F. to about 500 SUS at 210° F. Especially useful are the mineral oils from SAE 5 to SAE 120 grade. The source of the mineral oil is not critical.

To prepare the lubricating compositions of this invention it is usually necessary only to add the desired amount of the carbonated, basic metal salt to a mineral oil or to a mineral oil lubricant already containing other additives. A common practice is to prepare the carbonated, basic metal salt in a limited amount of the mineral oil to obtain a "concentrate" and then to dilute the concentrate with additional amounts of the mineral oil to prepare the final lubricating composition. The concentrate may contain as little as 1%, but usually from about 30% to 70% of the mineral oil. The concentrate may also contain other additives which are to be present in the final lubricating composition of this invention.

As indicated previously the lubricating compositions of this invention may contain other additives such as supplemental detergent additives, rust-inhibiting agents, corrosion-inhibiting agents, extreme pressure agents, antifoam agents, pour point depressing agents, viscosity index improving agents, metal-deactivating agents, oxidation-inhibiting agents, etc.

Group II metal phosphorodithioates are desirable for use in the lubricating compositions of this invention. The dialkylphosphorodithioates of zinc, calcium, and barium are especially preferred. The alkyl radicals usually contain at least about 7.6 aliphatic carbon atoms per each phosphorus radical within the molecular structure of the phosphorodithioates. The metal phosphorodithioates are illustrated by, for example, zinc dipenthylphosphorodithioate, zinc dicyclohexylphosphorodithioate, barium dioctylphosphorodithioate, calcium didodecylphosphorodithioate, barium di-(heptylphenyl)phosphorodithioate, barium salt of propyl octylphosphorodithioic acid, zinc salt of an equi-molar mixture of dicresylphosphorodithioic acid and diheptylphosphorodithioic acid, etc.

Other inhibiting agents useful in the lubricating compositions of this invention include the oil-soluble alkaline earth metal salts of alkylated phenolic compounds such as alkylphenols, alkylnaphthols, sulfurized alkylphenols and naphthols, and condensation products of the alkylated phenolic compounds with aldehydes or ketones. The alkyl radical in the phenolic compounds should contain at least about 7 carbon numbers in order to impart sufficient oil-solubility. Specific examples include barium salt of cetylphenol, calcium salt of octylphenol, strontium salt of polyisobutene(molecular weight of 250)-substituted phenol, barium salt of bis-(hydroxyphenyl) sulfide, calcium salt of the condensation product of heptylphenol with 0.5 mole of formaldehyde, calcium salt of bis-(hydroxyphenyl) disulfide, etc. Likewise useful are the basic metal salts of such alkylated phenolic compounds, i.e., compounds in which the metal is present in a stoichiometrically larger amount than the phenolic radical. The basic salts may be prepared by heating a mixture of an alkylated phenolic compound with an excess of an alkaline earth metal base such as is illustrated above; or by heating such a mixture with carbon dioxide at a tempertaure of about 100°–250° C.

Other inhibiting agents useful herein are illustrated by the sulfurized or phosphosulfurized hydrocarbons or fatty materials such as dibutyl tetrasulfide, dipentyl disulfide, the reaction product of alpha-pinene with sulfur or phosphorus pentasulfide, the reaction product of terpentine with phosphorus pentasulfide, the reaction product of methyl oleate with phosphorus sesquisulfide, the reaction product of sperm oil with sulfur, etc. Organic phosphites such as dialkyl phosphites and diaryl phosphites are also useful as inhibiting agents in lubricating compositions of this invention. Examples of the phosphites include dicyclohexyl phosphite, propyl octyl phosphite, diphenyl phosphite, di-(heptylphenyl) phosphite, dioctadecyl phosphite, etc. Supplemental detergent additives contemplated for use in the lubricating compositions of this invention may be the acylated amines, especially alkylene amines. A preferred class of the acylated alkylene amines are the reaction products of an ethylene amine such as ethylene diamine, diethylene triamine, tetraethylene pentamine, hexa- methylene heptamine, or triethylene tetramine with a hydrocarbon substituted succinic acid or anhydride in which the hydrocarbon substituent contains at least about 50 aliphatic carbon atoms. Specific examples of such acylated amines are the product obtained by heating at 150°–200° C. tetraethylene pentamine with two molar proportions of a polyisobutene (molecular weight of 1000)-substituted succinic anhydride and the product obtained by heating at 180°–250° C. ethylene diamine with one molar proportions (two equivalents) of a polypropene (molecular weight of 750)-substituted succinic acid.

The following examples illustrate the lubricating compositions of this invention:

*Example 1*

A mixture of 1360 grams of a mineral oil solution containing 550 grams (1 equivalent or 0.5 mole) of a neutral calcium bright stock sulfonate, 300 grams of toluene, 100 grams of methyl alcohol, 100 grams of iso-octyl alcohol, and 260 grams (7 equivalents) of calcium hydroxide is carbonated at 35°–47° C. until carbon dioxide is no longer absorbed by the reaction mixture. To this mixture there is added 10 grams of a 50% aqueous sodium hydroxide together with 10 grams of ammonium chloride dissolved in 20 grams of water. The resulting mixture is carbonated at 62° C. until its base number (phenolphthalein indicator) is reduced to 32. The mixture is filtered and the filtrate is heated at 160° C./15 mm. to remove volatile components. The residue is a concentrate of the carbonated, basic calcium bright stock sulfonate having a calcium sulfate ash content of 18% and a metal ratio of 3.9. A lubricating composition is prepared by blending SAE 20 mineral oil with 15% by weight of the above concentrate.

*Example 2*

A concentrate of a carbonated, basic calcium sulfonate is prepared by introducing carbon dioxide to a mixture of 700 grams (0.5 equivalent) of a 40% oil solution of neutral calcium bright stock sulfonate having a molecular weight of 1100, 900 grams of mineral oil, 296 grams (8 equivalents) of calcium hydroxide, 100 grams of methyl alcohol, 75 grams of iso-octyl alcohol, 2.5 grams of calcium chloride, and 2.5 grams of water. The carbonation is continued at 50°–58° C. until the mixture has a base number of 43 (phenolphthalein indicator). The mixture is then heated at 150° C. to distill off all volatile components. The residue is filtered and the filtrate has a calcium sulfate ash content of 19.7% and a metal ratio of 10.7. A lubricating composition is prepared by blending SAE 30 mineral oil with 3% of the above concentrate and 0.1% of phosphorus as zinc di-octylphosphorodithioate.

*Example 3*

A concentrate of a carbonated, basic metal salt is prepared by the procedure substantially the same as is described in Example 2 except that the ratio of equivalents of calcium hydroxide to the neutral calcium bright stock sulfonate used is 15.5:1 and that the calcium hydroxide is added to the reaction mixture in 4 increments, each increment being followed by a carbonation step. The filtered product has a calcium sulfate ash content of 27% and a metal ratio of 16. A lubricating composition is prepared by blending SAE 90 mineral oil with 5% of the concentrate, 0.15% of phosphorus as zinc di-cyclohexyl-phosphorodithioate, and 2% of an acylated amine obtained by heating 1 mole of a polyisobutene (molecular weight of 1000)-substituted succinic anhydride with 0.4 mole of tetraethylene pentamine at 150° C.–220° C. and removing the water formed thereby.

*Example 4*

The carbonated metal salt of Example 3 is converted to a metal salt having a higher metal ratio as follows: To 2900 parts (by weight) of the concentrate of the carbonated, basic metal salt of Example 3, 150 parts of methyl alcohol, 150 parts of octyl alcohol, 6 parts of calcium chloride, and 6 parts of water there is added 550 parts of lime (77% purity) in 4 portions, each addition being followed by carbonation at 47° C.–52° C. The carbonated product is heated at 155° C./16 mm. to distill off volatile components and the residue is filtered. The filtrate is a concentrate of a carbonated, basic calcium bright stock sulfonate having a calcium sulfate ash content of 44.8% and a metal ratio of 31.6. A lubricating composition is prepared by blending SAE 30 mineral oil with 25% of this concentrate, 1% of calcium salt of 2,2'-methylene-bis (4-heptyl-phenol), and 3% of polyisobutene (molecular weight of 750)-substituted succinimide of N-aminoethyl piperazine.

*Example 5*

A carbonated basic metal salt is prepared by introducing carbon dioxide into a mixture of 350 parts (by weight) of the oil solution of neutral calcium bright stock sulfonate described in Example 1, 73 parts of distilled tall oil acid having an acid number of 195 (1 equivalent per equivalent of the sulfonate used), 900 parts of mineral oil, 100 parts of methyl alcohol, 75 parts of octyl alcohol, 2 parts of calcium chloride, and 400 parts (11 equivalents) of calcium hydroxide. The carbonation is carried out at 40°–52° C. until the mixture no longer absorbs carbon dioxide. The carbonated mixture is then heated at 150°–160° C. to distill off volatile components and the residue is filtered. The filtrate is a 50% oil solution of a carbonated, basic calcium salt of a mixture of bright stock sulfonic aicd and tall oil acid and has a calcium sulfate ash content of 17.9% and a metal ratio of 8.3. A lubricating composition is prepared by blending SAE 10 mineral oil with 10% of this oil solution and 2% of di-benzyl disulfide.

*Example 6*

A mixture of 360 parts of the oil solution of the neutral calcium bright stock sulfonate described in Example 1, 40 parts of distilled tall oil acid having an acid number of 195, 800 parts of mineral oil, 90 parts of methyl alcohol, 45 parts of octyl alcohol, 45 parts of toluene, 2 parts of calcium chloride, and 370 parts of calcium hydroxide is carbonated at 48°–65° C. until the base number of the mixture is reduced to 28. The carbonated mixture is heated at 150°–160° C./15 mm. and the residue filtered. The residue is a 47% oil solution of a carbonated, basic calcium salt having a calcium sulfate ash content of 30% and a metal ratio of 17.5. A lubricating composition is prepared by blending SAE 30 mineral oil with 30% of this oil solution.

*Example 7*

A carbonated, basic calcium salt is prepared by a procedure similar to that of Example 6 except that 300 parts of the oil solution of the neutral calcium bright stock sulfonate is used and that 100 parts of naphthenic acid having an acid number of 250 is used in place of the distilled tall oil acid. The resulting concentrate is a 50% oil solution of a carbonated, basic calcium salt of a mixture of bright stock sulfonic acid and naphthenic acid and has a calcium sulfate ash content of 32.4% and a metal ratio of 12.2. A lubricating composition is obtained by mixing SAE 40 mineral oil with 20% of this concentrate, 0.5% of dibutyl tetrasulfide, 3% of an ashless detergent obtained by heating equi-molar amounts of polyispropene (molecular weight of 1500)-substituted succinic acid and ethylene diamine at 150°–250° C. and removing the water formed thereby.

*Example 8*

A carbonated, basic calcium salt is prepared by introducing at 45°–60° C. carbon dioxide to a mixture of a mineral oil solution of the neutral calcium bright stock sulfonate of Example 1 (0.5 gram-equivalent), 370 grams (10 equivalents) of calcium hydroxide, 200 grams of methyl alcohol, and 100 grams of octyl alcohol until the mixture is slightly acidic to phenolphthalein indicator. The mixture is heated at 150° C. and filtered. The filtrate is a 42% oil solution of the salt having a calcium sulfate ash content of 10.4% and a metal ratio of 5.3.

The emulsion resistance of the lubricating compositions of this invention is demonstrated by the results of an emulsification test in which a mixture of a 50 cc. sample of a lubricating composition and 2.5 cc. of distilled water in a 4-ounce bottle is homogenized by vigorous agitation and thereafter allowed to settle at room temperature for a specified period. At the end of the period the formation of an emulsified layer is noted. The smaller the layer, the greater the emulsion resistance of the lubricating composition. The results of the test are illustrated in Table I below.

TABLE I.—EMULSIFICATION TEST

| Sample tested (percent by weight) | Time allowed to settle, hours | Formation of emulsified layer (percent of total volume of sample) |
|---|---|---|
| A. SAE 30 mineral oil containing 20% of the concentrate of the carbonated, basic calcium salt of Example 1 | 72 | 2.5 |
| B. SAE 30 mineral oil containing 20% of the concentrate of the carbonated, basic calcium salt of Example 2 | 72 | None |
| C. SAE 30 mineral oil containing 20% of the concentrate of the carbonated, basic calcium salt of Example 4 | 72 | None |
| D. SAE 30 mineral oil containing 20% of the concentrate of the carbonated, basic calcium salt of Example 5 | 72 | None |
| E. SAE 30 mineral oil containing 20% of the concentrate of the carbonated, basic calcium salt of Example 6 | 48 | None |
| F. SAE 30 mineral oil containing 20% of the concentrate of the carbonated, basic calcium salt of Example 7 | 48 | None |
| G. SAE 30 mineral oil containing 20% of the oil solution of the carbonated, basic calcium salt of Example 8 | 72 | 7 |
| H. Same as Sample A except that the carbonated, basic calcium salt has a metal ratio of 2.6 | 72 | 80 |
| I. Same as Sample D except that the carbonated, basic calcium salt is derived from an acid mixture consisting of bright stock sulfonic acid and tall oil acid in weight ratio of 1:3 respectively | 72 | 100 |
| J. Same as Sample A except that the carbonated, basic calcium salt is derived from mahogany acid and has a metal ratio of 12.3 | 72 | 100 |

The lubricating compositions of this invention are more resistant to deterioration, especially under high temperature and oxidizing service conditions, than those which contain as an additive a carbonated, basic alkaline earth metal sulfonate derived from sulfonic acids other than bright stock sulfonic acids. This superiority is unexpected inasmuch as the source of the sulfonic acid in preparing the additive has not been thought to be critical with respect to its ability to stabilize the lubricating composition. The resistance to deterioration of the lubricating compositions is demonstrated by the results of an oxidation test which consists of bubbling air through a 300-gram lubricant sample having immersed therein a copper strip (2 x 8 inches, oxidation promoter) at 300° F. and measuring the viscosity increase of the oxidized sample over the initial (unoxidized) sample. A greater increase of viscosity indicates a lower resistance to deterioration. By this test an SAE 30 lubricant containing 1.6% (by weight of metal sulfate ash) of a carbonated, basic calcium bright stock sulfonate having a metal ratio of 12 and prepared by the procedure similar to that described in Example 2 gives a result of viscosity increase of 219% at the end of 120 hours of test. A control lubricant, same as the above except that the metal sulfonate is derived from mahogany sulfonic acid, gives a result of viscosity increase of 379%.

As indicated previously, the lubricating compositions of this invention are useful especially in the crankcase of internal combustion engines, particularly diesel engines.

They are further adapted for use in the heavy duty diesel engines such as the marine diesel engines used in seagoing vessels. The marine diesel engines may be of the type of direct drive such as double-acting, 2-cycle; single-acting, 2-cycle; or single-acting, 4-cycle engines or of the type of indirect drive such as geared diesel engine or diesel-electric engines. These engines are described in detail in Pounder, "Diesel Engine Principles and Practice," chapter 23, Philosophical Library Incorporated, 1955. The marine diesel engines are operated on fuels having up to about 5%, more often from about 0.1% to 3% by weight of sulfur and are operated under conditions which are highly conducive to the contamination of their lubricating compositions by water. It is highly desirable to incorporate into such lubricating compositions additives which have greatly reduced tendency to emulsify water. The carbonated, basic metal detergents of this invention, therefore, are especially useful as the detergent additives in such lubricating compositions.

Another important application of the carbonated, basic metal salts of this invention is in lubricants which may come into contact with water before it is introduced into the engine which it lubricates. One example is a lubricant transported by ocean-going vessels where the lubricant is stored in tanks which may also contain water to make up for the proper ballast. In this situation, the lubricant tends to emulsify with water and will usually be contaminated with a considerable quantity of water as it is withdrawn from the storage tanks. It then becomes necessary to subject the lubricant to a drying operation before it is introduced into the engine. The drying operation is time-consuming and expensive. However, in the case where the lubricant contains as an additive the carbonated, basic metal salt of this invention, it usually does not emulsify to an appreciable extent and will contain little or no water upon withdrawal from the storage tanks. Consequently, the drying operation can be eliminated or carried out at a substantially reduced cost.

Another example is found where a lubricant is introduced into an engine by means of a metering device in which the lubricant is passed through a column of water or an aqueous solution of a salt such as calcium nitrate at a controlled rate. Such a device is commonly used in controlling the injection of a lubricant into a marine diesel engine. It is readily appreciated that if the lubricant tends to emulsify water it will be contaminated with a significant quantity of water as it is circulated throughout the engine and will cause excessive rusting and corrosion of the engine parts. The emulsion-resistant carbonated, basic metal salts of this invention, therefore, are desirable for use in such lubricating compositions.

The efficacies of the carbonated basic metal salts of this invention as lubricant additives are further demonstrated by engine tests. One engine test is the CRC-L-1 test in which the lubricating composition is used in the crankcase of a 4-stroke diesel engine having a compression ratio of 15:1 and operated for 480 hours under the following conditions: speed, 100 r.p.m.; B.t.u input per minute, 2900-3000; load, 20 brake horse-power; water jacket outlet temperature, 175-180° F.; and oil temperature, 140-150° F. A diesel fuel having a sulfur content of 1% is used and the oil is changed after every 120 hours of operation. The lubricating composition is evaluated in terms of (1) the piston cleanliness, on a rating scale of 0-100, 100 being indicative of no deposits and 0 being indicative of heavy deposits and (2) the amount of ring filling. By this test a SAE 30 mineral lubricating composition containing 1.59% (by volume) of the concentrate of the carbonated, basic metal salts prepared as is described in Example 3 gives the following results: ring filling, 3%; and piston cleanliness rating, 97.5.

Another engine test is a modified CRC EX-3 test, the modification consisting in extending the test period from 96 hours to 144 hours, thus making the test more severe. This test is recognized in the field as an important test by which lubricants can be evaluated for use under light-duty service conditions such as are encountered in the operation of passenger cars in urban traffic. In this test the lubricant is used in the crankcase of a 6-cylinder Chevrolet Powerglide engine operated under recurring cyclic condition, each cycle consisting of: 2 hours at engine speed of 500 r.p.m. under 0 load, oil sump temperature of 100-125° F., and air:fuel ratio of 10:1; and two hours at an engine speed of 2500 r.p.m. under a load of 40 brake horse-power, oil sump temperature of 240-280° F., and air:fuel ratio of 16:1. At the end of the test the lubricant is rated in terms of (1) the extent of piston filling, (2) the amount of sludge formed in the engine on a scale of 80-0, 80 being indicative of no sludge and 0 begin indicative of extremely heavy sludge, and (3) the total amount of engine deposits i.e., sludge and varnish formed in the engine on a scale of 100-0, 100 being indicative of no deposits and 0 being indicative of extremely heavy deposits. By this test a SAE 20 mineral lubricating composition containing 0.86% (by volume) of the concentrate of the carbonated basic metal salts prepared as is described in Example 3 gives the following results: piston filling, 1%; sludge deposit rating, 74.8; and total deposit rating, 93.8.

The effectiveness of the carbonated, basic metal salt of this invention in lubricants for marine diesel engines is shown by the results of the following engine test. In this test, a two-stroke, uniflow crosshead, 2-cylinder marine diesel engine (Bolnes 2L Engine) having a bore and stroke of 7½ x 13¾ inches is operated for 100 hours or the multiples thereof under the following conditions: engine speed, 430 r.p.m.; output, 75 brake horsepower; coolant temperature, 140° F.; feed rate of cylinder lubricant, 0.0025 pound per brake horsepower per hour; and fuel, diesel fuel having a Redwood No. 1 viscosity value of 1390 seconds and a sulfur content of 3.8%. At the end of the test, the effectiveness of the lubricant is evaluated in terms of the weight loss of the piston rings. A lubricant which consists of a mineral lubricating oil having a viscosity value of 71 Saybolt Universal seconds at 210° F. containing 20% by volume of the carbonated, basic metal salt prepared as is described in Example 3 gives a piston ring weight loss of 764 and 1000 milligrams (duplicate results). For comparison, a commercial marine diesel engine lubricant gives a piston ring weight loss of 1779 and 1763 milligrams (duplicate results).

What is claimed is:

1. An oil-soluble composition suitable for use as a detergent having a reduced tendency to emulsify water consisting essentially of a carbonated, basic alkaline earth metal salt of an acidic substance selected from the class consisting of bright stock sulfonic acids and mixtures of at least about 50% of a bright stock sulfonic acid and less than about 50% of a carboxylic acid having at least about 12 aliphatic carbon atoms, said metal salt being characterized by a metal ratio of at least about 3.

2. An oil-soluble composition suitable for use as a detergent having a reduced tendency to emulsify water consisting essentially of a carbonated, basic alkaline earth metal salt of a bright stock sulfonic acid, said metal salt being characterized by a metal ratio of at least about 3.

3. The oil-soluble composition suitable for use as a detergent of claim 2 characterized further in that the alkaline earth metal salt is a calcium salt.

4. The oil-soluble composition suitable for use as a detergent of claim 2 characterized further in that the carbonated basic alkaline earth metal salt has a metal ratio within the range of from about 8 to about 35.

5. An oil-soluble composition suitable for use as a detergent having a reduced tendency to emulsify water consisting essentially of a carbonated, basic alkaline earth metal salt prepared by carbonating a mixture consisting essentially of (A) an acidic substance selected from the class consisting of bright stock sulfonic acids and mixtures of at least about 50% of a bright stock sulfonic acid and less than about 50% of a carboxylic acid and having at least about 12 aliphatic carbon atoms, (B) an alcohol, and (C) at least about 3 equivalents of an alkaline earth metal base per equivalent of (A) at a temperature from about 25° C. to the boiling point of the mixture; and thereafter heating the carbonated mixture to rid of volatile components.

6. An oil-soluble composition suitable for use as a detergent having a reduced tendency to emulsify water consisting essentially of a carbonated, basic calcium salt prepared by carbonating a mixture consisting essentially of (A) a bright stock sulfonic acid, (B) an alcohol, and (C) at least about 3 equivalents of calcium hydroxide per equivalent of the bright stock sulfonic acid at a temperature from about 25° C. to the boiling point of the mixture; and thereafter heating the carbonated mixture to rid of volatile components.

7. An oil-soluble composition suitable for use as a detergent having a reduced tendency to emulsify water consisting essentially of a carbonated, basic calcium salt prepared by carbonating a mixture consisting essentially of (A) a mineral oil solution of a bright stock sulfonic acid, (B) from about 0.25 to about 10 equivalents of an alcohol having less than about 10 carbon atoms per equivalent of the bright stock sulfonic acid (C) from about 8 to about 20 equivalents of calcium hydroxide at a temperature between about 50° C. and the boiling point of the mixture; and thereafter heating the carbonated mixture to rid of volatile components.

8. An oil soluble composition suitable for use as a detergent having a reduced tendency to emulsify water consisting essentially of a carbonated, basic calcium salt prepared by carbonating a mixture consisting essentially of (A) a mineral oil solution of a bright stock sulfonic acid, (B) from about 0.5 to about 5 equivalents of an alcohol mixture containing methyl alcohol and octyl alcohol in a weight ratio within the range from about 1:2 to about 2:1, and (C) about 20 equivalents of calcium hydroxide at a temperature between about 50° C. and about 80 C. and thereafter heating the carbonated mixture to rid of the volatile components.

9. A composition comprising a major proportion of a lubricating oil and a minor amount, sufficient to impart detergency to said oil, of the oil-soluble composition of claim 1.

10. A lubricating composition suitable for use in a diesel engine comprising a major proportion of a mineral lubricating oil and a minor amount, sufficient, to impart detergency to said oil, of the oil-soluble composition of claim 5.

11. A lubricating composition suitable for use in a diesel engine comprising a major proportion of a mineral lubricating oil and a minor amount, sufficient to impart detergency to said oil, of the oil-soluble composition of claim 7.

12. A lubricating composition suitable for use in a diesel engine comprising a major proportion of a mineral lubricating oil and a minor amount, sufficient to impart detergency to said oil, of the oil-soluble composition of claim 8.

References Cited by the Examiner

UNITED STATES PATENTS

| 2,848,415 | 8/1958 | Logan | 252—33 |
| 2,865,956 | 12/1958 | Ellis et al. | 252—33 X |
| 2,865,957 | 12/1958 | Logan | 252—33 X |
| 2,884,445 | 4/1959 | Axe et al. | 252—33 X |
| 2,947,694 | 8/1960 | Gragson | 252—33 |
| 3,057,896 | 10/1962 | Schlicht et al. | 252—18 X |
| 3,172,855 | 3/1965 | Rogers et al. | 252—33 X |
| 3,223,630 | 12/1965 | Gragson | 252—33 |

FOREIGN PATENTS

| 605,743 | 9/1960 | Canada. |
| 774,683 | 5/1957 | Great Britain. |

DANIEL E. WYMAN, *Primary Examiner.*

R. E. HUTZ, P. P. GARVIN, *Assistant Examiners.*